United States Patent [19]

Nomura

[11] Patent Number: 4,789,225
[45] Date of Patent: Dec. 6, 1988

[54] DEVICE FOR DRIVING A LENS UNIT HAVING A TRIPOD MOUNT

[75] Inventor: Hiroshi Nomura, Tokyo, Japan

[73] Assignee: Asahi Kogaku Kogyo Kabushiki Kaisha, Tokyo, Japan

[21] Appl. No.: 30,517

[22] Filed: Mar. 27, 1987

[30] Foreign Application Priority Data

Mar. 27, 1986 [JP]   Japan .................................. 61-69503

[51] Int. Cl.⁴ .......................... G02B 7/02; G03B 1/18
[52] U.S. Cl. .................................... 350/255; 350/429; 354/402; 354/195.12
[58] Field of Search ....................... 350/255, 257, 429; 354/400, 402, 403, 195.12

[56] References Cited

U.S. PATENT DOCUMENTS

| | | | |
|---|---|---|---|
| 4,416,526 | 11/1983 | Iomori et al. | 354/195.12 |
| 4,472,033 | 9/1984 | Fukuhara et al. | 350/429 |
| 4,548,488 | 10/1985 | Honda et al. | 354/402 |

Primary Examiner—John K. Corbin
Assistant Examiner—Loha Ben
Attorney, Agent, or Firm—Sughrue, Mion, Zinn, Macpeak & Seas

[57] ABSTRACT

A drive mechanism for a lens unit with a tripod mount. The tripod mount is on a stationary cylinder while the camera mount is on a rotatable cylinder which contains a drive shaft for mechanically driving a lens axially movable along the stationary cylinder. A drive gear supported by the stationary cylinder causes the linear movement of lens by its rotation. A planetary gear system, coupled to the stationary cylinder connects the drive shaft and the drive gear.

8 Claims, 3 Drawing Sheets

DEVICE FOR DRIVING A LENS UNIT HAVING A TRIPOD MOUNT

BACKGROUND OF THE INVENTION

1. Field of the Invention

This invention relates to a device for driving a lens unit, such as a telephoto lens, having a tripod mount and which is driven by a drive source provided on the side of a camera body, so as to be focused on an object.

2. Background of the Invention

Heretofore, the construction of a telephoto lens with a tripod mount is such that the lens barrel is freely rotatable with respect to the tripod mount. Roughly stated, there are two types of construction available for such telephoto lenses. In one of the two types of constructions, the telephoto lens is turned at the tripod mount. In the other type of construction, only the mount part and the automatic aperture control mechanism are turned. The former type of construction is simple. However, in this type of construction, the total weight of the lens is supported only by the lens-turning part of the tripod mount. Also, in order to prevent blurring which may be caused when the shutter is operated, the tripod mount is, in general, spaced away from the center of gravity of the lens, with the result that a relatively large moment of force is required to turn the camera. Accordingly, when it is required to change the photographic composition by turning the camera, the camera must be turned with a relatively large force. Therefore, it is rather troublesome to operate the camera with the telephoto lens of this type. On the other hand, in the case of the latter type of construction, even if the lens is large both in diameter and in weight, there are only a few parts to be turned, and therefore the photographic composition can be readily changed.

An automatic focusing single-lens reflex camera in which the focusing lens in the lens barrel is driven by a drive source built in the camera body has been highlighted recently. What is obtained by applying this mechanism of the reflex camera to a telephoto lens having the latter type of construction is a lens barrel shown in FIG. 3. However, the lens barrel is disadvantageous in that, when it is required to turn the lens barrel to change the photographic composition, the lens barrel must be turned through a relatively large angle, and the rotation of the lens barrel causes the lens to be out of focus.

The construction of the telephoto lens barrel shown in FIG. 3 and its problems will be described in detail.

As shown in FIG. 3, a stationary cylinder 3 is secured to a tripod mount 1 with screws 2 which is mounted on a tripod (not shown). A rotatable cylinder 4 is rotatably supported within the stationary cylinder 3. A protrusion 5 is formed on the outer wall of the rotatable cylinder 4 and is held in contact with an annular guide 6 secured to the stationary cylinder 3 so that the rotatable cylinder 4 is rotatable with its axial movement inhibited. The tripod mount 1 has a locking member 7 for locking the rotatable cylinder 4 to the stationary cylinder 3.

The stationary cylinder 3 has a small-diameter part 8 which is engaged with the inner surface of an inner cylinder 10 of a drive ring 12. The drive ring 12 is made up of the inner cylinder 10, an outer cylinder 9 and a flange 11 through which the inner cylinder 10 is connected to the outer cylinder 9. The axial movement of the drive ring 12 is prevented by a cylinder 13 which is secured to the small-diameter part 8 of the stationary cylinder 3 with screws. The angle of rotation of the drive ring 12 is regulated by a stopper 14 which is secured to the cylinder 13 with screws.

A lens frame 16 supporting a movable focusing lens 15 is mounted within the inner cylinder 10 in such a manner that it is movable in the axial direction and rotatable around the axis.

In order to convert the rotation of the drive ring 12 into the axial movement of the lens frame 16 (and accordingly of the lens 15), a straight movement guide groove 17 is formed in the inner cylinder 10 of the drive ring 12 and a cam groove 18 is formed in the small-diameter part 8 of the stationary cylinder 3. A pin 19 embedded in the lens frame 16 is engaged with the straight movement guide groove 17 and the cam groove 18. Therefore, the lens 15 is moved by manually turning the outer cylinder 9 of the drive ring 12.

A drive shaft 24 is rotatably supported in a close fitting cylindrical hole in the rotatable cylinder 4 so that the lens 15 can be driven also by the motor built in the camera body. The joint 25 is of the type that, unless driven, it maintains the orientation of the drive shaft 24 with respect to the rotatable cylinder 4 even when the rotatable cylinder 4 is rotated. When the joint 25 is driven by the motor from the side of the camera body at any rotational position of the rotatable cylinder 4, it rotates the drive shaft 24 relative to the rotatable cylinder.

The drive shaft 24 has the joint 25 at the rear end. The joint 25 is located at a mount part 20 so as to be engaged with the camera body. The drive shaft 24 has a gear 23 at the front end. The gear 23 is engaged with an intermediate gear 22 which is rotatably fitted on a supporting ring 21 which is threadably engaged with the stationary cylinder 3. A cooperating shaft 26 rotatably supported by the stationary cylinder 3 has a gear 27 at one end. The gear 27 is engaged with the intermediate gear 22. Its shaft 26 has a gear 29 at the other end which is engaged with a gear 28 formed on the inner cylinder 10 of the drive ring 12. Therefore, the lens can be driven also by the power of the drive source built in the camera body.

However, because of the drive shaft 24 provided in the rotatable cylinder 4, the telephoto lens barrel shown in FIG. 3 suffers from the following difficulties.

As was described above, the joint 25 of the drive shaft 24 is connected to the joint (not shown) of the camera body. Therefore, when the rotatable cylinder 4 is rotated in order to change the composition, the drive ring 12 is also turned through the intermediate gear 22 and the cooperating shaft 26 so that the lens 15 is moved, that is, it is moved out of focus. If the rotatable cylinder 4 is turned with the rotation of the drive ring 12 prevented with the stopper 14a, the drive shaft 24 is turned because in this case the intermediate gear 22 is held fixed.

However, depending on the rotation of the drive shaft, considerably large torque is required to turn the joint of the camera body, because, as was described above, the joint 25 of the drive shaft 24 is coupled to the joint of the camera body, which is generally coupled to the motor and reduction gear train system which is so arranged as to accelerate the motor as viewed from the lens. Therefore, when the rotation of the drive ring 12 is stopped by the stopper 14a, immediately it becomes difficult to turn the rotatable cylinder 4.

SUMMARY OF THE INVENTION

Accordingly, an object of this invention is to eliminate the above-described difficulties accompanying a conventional device for driving a lens unit having a tripod mount.

More specifically, an object of the invention is to provide a device for driving a lens unit with a tripod mount in which the lens is driven by a drive source built in a camera body and in which the lens barrel can be readily turned by rotating only the rotatable cylinder.

In the device according to the invention, the lens barrel of the type that the lens is driven by the motor provided on the side of the camera body is made up of a stationary cylinder secured to the tripod mount and a rotatable cylinder having the camera mount which is coupled to the camera body. In the lens barrel thus constructed, when the drive shaft which is driven by the motor built in the camera body to drive the lens is revolved by rotating the rotatable cylinder, the rotation of the drive shaft is not transmitted to the lens. According to the invention, the rotatable cylinder having the camera mount is rotatably fitted in the stationary cylinder having the tripod mount. A drive shaft which is rotated by the drive source built in the camera body is provided in the rotatable cylinder. A drive gear which rotates around the optical axis and a lens which is moved in the direction of optical axis as the drive gear rotates are supported by the stationary cylinder. A planet gear mechanism is interposed between the drive gear and a gear mounted on the drive shaft. The planet gear mechanism transmits the rotation of the drive shaft to the drive gear, but not when the drive shaft is revolved by rotation of the rotatable cylinder. Therefore, when the camera is turned together with the rotatable cylinder in order to change the photographic composition, no load or resistance force is applied to the rotatable cylinder, and therefore the camera can be readily turned.

DETAILED DESCRIPTION OF THE PREFERRED EMBODIMENTS

Figure 1:
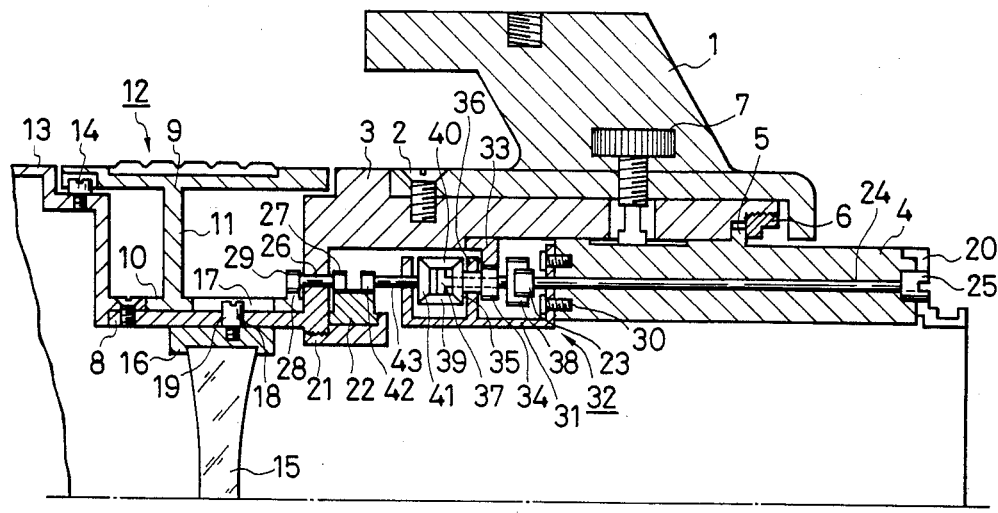
FIG. 1 is a sectional view, with the lower half omitted, showing a lens driving device in a camera according to one embodiment of this invention.

This invention will be described with reference to its preferred embodiments shown in the accompanying drawings. FIG. 1 shows a lens barrel according to a first embodiment of the invention. In FIG. 1, parts corresponding functionally to those described with reference to FIG. 3 showing the conventional lens barrel are therefore designated by corresponding reference numerals or characters.

Figure 3:
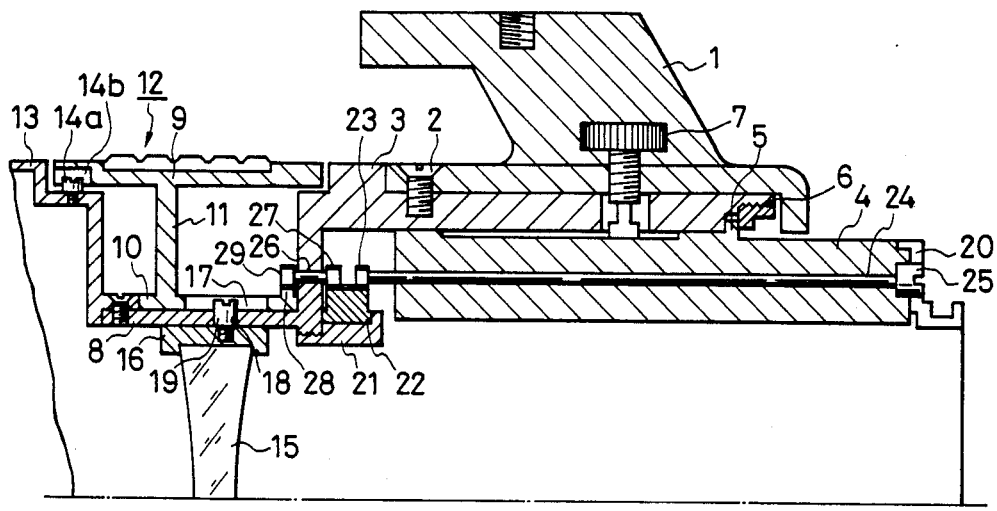
FIG. 3 is a sectional view, with the lower half omitted, showing a conventional lens driving device in a camera.

In the lens barrel shown in FIG. 1, the stationary cylinder 3 has nearly identical structure to that in the conventional lens barrel shown in FIG. 3. A tripod mount 1 is secured to the stationary cylinder 3. A rotatable cylinder 4 is rotatably provided within the stationary cylinder 3. The rotatable cylinder 4 has a camera mount 20 at one end which is coupled to the camera body. A drive ring 12 is rotatably fitted on the stationary cylinder 3 so that a lens 15 within the stationary cylinder 3 can be moved in the direction of the optical axis by manually turning the drive ring 12. A drive shaft 24 rotatably provided in the rotatable cylinder 4 has a joint 25, of the same type as described before, at its outer end and a gear 23 at its inner end.

A gear case 31 is secured to the other end face of the rotatable cylinder 4 with screws 30. A differential gear mechanism 32 in the gear case 31 transmits the rotation of the drive shaft 24 to freely rotating intermediate gear 22. The differential gear mechanism 32 is a kind of planet gear mechanism in which the gears and the arms are not fixed. The differential gear mechanism 32 has a gear 34 engaged with an internal gear 33 secured to the stationary cylinder 3. The differential gear mechanism 32 also has a bevel gear 35 and a sleeve 36 rotatably supported by the gear case 31. An arm member 37, which penetrates the gear 34, the bevel gear 35 and the sleeve 36 extending along the central axis, has a gear 38 at one end which is engaged with the gear 23 of the drive shaft 24. Transverse bevel gears 39 and 40 serving as planet gears are rotatably supported on the other end of the arm member 37 and are engaged with the aforementioned bevel gear 35. Furthermore, an intermediate shaft 43 is rotatably supported by the gear case 31. The intermediate shaft 43 has a bevel gear 41 at one end which is engaged with the transverse bevel gears 39 and 40, and a gear 42 at the other end which is engaged with the intermediate gear 22. With the differential gear mechanism 32, the rotation of the drive shaft 24 is transmitted to the intermediate gear 22 thereby to drive the lens. When, on the other hand, the drive shaft 24 is revolved around the optical axis by the rotation of the rotatable cylinder 4, the rotation of the drive shaft 24 caused by the revolution is not transmitted to the intermediate gear 22, and therefore the lens is not driven. The intermediate gear 22 is the gear whose rotation drives the lens.

In the case where, in the lens barrel thus constructed, the lens 15 is moved by the power source provided in the camera body, the motor in the camera body is operated to rotate the drive shaft 24. As a result, the arm member 37 is turned because the gear 23 on the end of the drive shaft 23 is engaged with the gear 38. In this operation the input bevel gear 35 is in a fixed state because the gear 34 integral with the bevel gear 35 is engaged with the internal gear 33. Therefore, as the transverse bevel gears 39 and 40 rotate and revolve, the speed of rotation twice as high as that of the gear 38 is transmitted to the output bevel gear 41, and accordingly to the gear 42. Therefore, the intermediate gear 22 is rotated, and the lens 15 is driven similarly as in the case of FIG. 3. As was described above, the speed of rotation twice as high as that of the gear 38 is transmitted to the gear 42; that is, the speed of rotation is increased by the differential gear mechanism 32. Therefore, the gear 38 is made larger in diameter than the gear 23 to decrease the speed of rotation.

When the rotatable cylinder 4 is rotated in the stationary cylinder 3 so as to change the photographic composition, the drive shaft 24 is not rotated because the joint 25 at the end of the drive shaft 24 is coupled to the camera body. Therefore, the arm member 37 is not rotated, and the bevel gears 39 and 40 are not revolved. On the other hand, as the rotatable cylinder 4 rotates, the input bevel gear 35 is revolved around the optical axis. Therefore, the input bevel gear 35 is rotated through the gear 34 which is engaged with the internal gear 33. The rotation of the input bevel gear 35 is transmitted through the bevel gears 39, 40 and 41 to the gear 42. However, the rotation is not transmitted to the intermediate gear (drive gear) 22 because the gear 42 is revolved around the optical axis. In this connection, it should be noted that the gear ratio in the rotation which is transmitted to the bevel gear 35 through the gear 34 which is engaged with the internal gear 33 is equal to the gear ratio in the case when the bevel gear 41 is rotated through the intermediate gear 22 which is engaged with the gear 42. Thus, the lens 15 is not driven even if the rotatable cylinder 4 is rotated.

Figure 2:
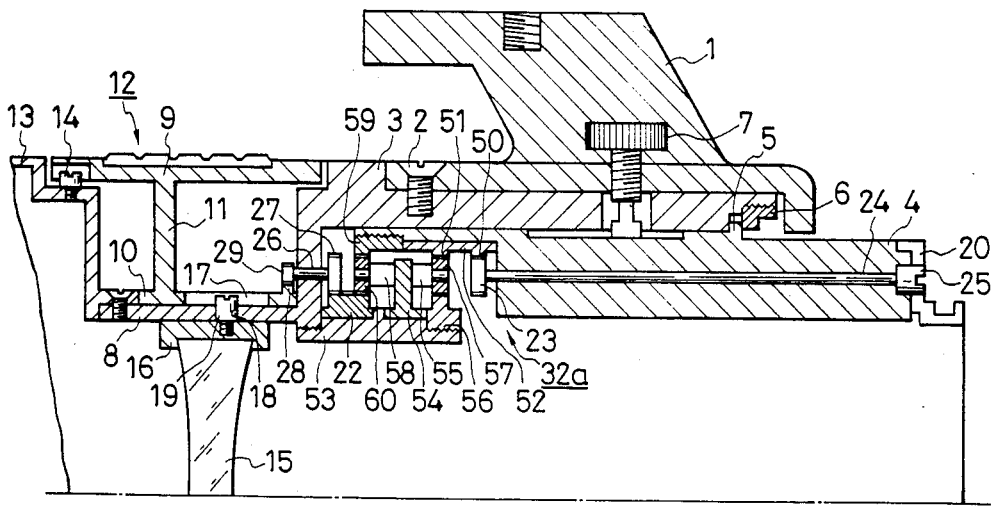
FIG. 2 is a sectional view, with the lower half omitted, showing another embodiment of the invention.

A second embodiment of the invention will be described with reference to FIG. 2. In FIG. 2, components corresponding functionally to those which have been already described are designated by corresponding reference numerals.

As shown in FIG. 2, a rotary gear 52 having teeth 50 and 51 is rotatably supported by a rotary cylinder 4. A supporting ring 53 is disposed inside the rotary internal gear 52 and is secured to a stationary cylinder 3. An intermediate gear (drive gear) 22 is rotatably supported on the outer wall of the supporting ring 53. An annular rotary bracket 54 is rotatably mounted on the outer wall of the supporting ring 53. The gear 23 mounted on the inner end of the drive shaft 24 is engaged with the teeth 50 of the rotary internal gear 52. A planet gear 57 engaged with the teeth 51 of the rotary internal gear 52 and a gear 56 secured to the supporting ring 53 is mounted on a shaft 55 which is supported by the rotary bracket 54. A planet gear 60 is mounted on a shaft 58 which is supported by the rotary bracket 54. The planet gear 60 is engaged with the intermediate gear 22 and an internal gear 59 secured to the rotary cylinder 4. These planet gears 57 and 60 form a planet gear mechanism 32a.

The operation of the lens driving device shown in FIG. 2 will be described.

In the case where the lens 15 is driven by the drive power provided in the camera body, the drive shaft 24 is rotated by the motor built in the camera body, so that the gear 23 and the rotary internal gear 52 are rotated. As the rotary internal gear 52 rotates, the planet gear 57 is revolved around the optical axis because the gear 56 is secured through the supporting ring 53 to the stationary cylinder 3. Therefore, the rotary bracket 54 is rotated and the planet gear 60 is revolved. As the planet gear 60 revolves, the intermediate gear 22 is rotated because the internal gear 59 is fixed, as a result of which the lens 15 is driven.

When the rotary cylinder 4 is rotated in the stationary cylinder 3, for instance, for changing the photographic composition, similarly as in the above-described first embodiment, the drive shaft 24 is not rotated because its joint 25 is coupled to the camera body. Accordingly, the rotary internal gear 52 which has become rotatable in the rotary cylinder 4 does not rotate with respect to the rotary cylinder 4 but rotates together with the rotary cylinder 4. Therefore, the planet gear 57 is revolved around the gear 56 which is held fixed.

Since the gear ratio of the teeth 51 of the rotary internal gear 52 to the gear 56 is equal to the gear ratio of the internal gear 59 to the intermediate gear 22, the planet gear 60 is revolved similarly as in the case of the planet gear 57. That is, the planet gears 57 and 60 revolve around the gears 56 and 22 which are held fixed, respectively, but the intermediate gear 22 is not rotated. Therefore, even if the rotary cylinder is rotated, the drive ring 12 is not rotated. That is, the lens 15 is not driven.

Figure 4:
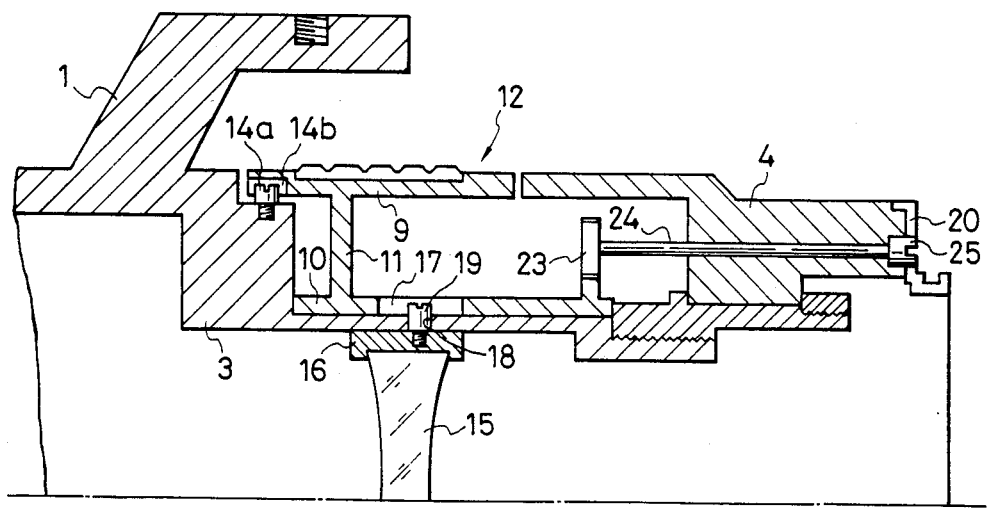
FIG. 4 is a sectional view showing essential components of a lens barrel with a tripod which is different from those shown in FIGS. 1 and 2, and to which the technical concept of the invention is applicable.

In the first and second embodiments described above, the intermediate gear 22 is used as a drive gear to drive the lens 15, and the intermediate gear 22 is operatively coupled to the drive ring 12. However, the technical concept of the invention can be also applied to a telephoto lens barrel in which the drive ring 12 has a gear which is used as a lens drive gear. A lens structure of this type is as shown in FIG. 4. A tripod mount 1 integral with a stationary cylinder 3 is provided in front of the drive ring 12, and a rotatable cylinder 4 rotatably supported by the stationary cylinder 3 is arranged at the rear of the drive ring 12. In this embodiment, the gear 23 provided at the end of the drive shaft 24 is engaged directly with the teeth 28 of the drive ring 12.

Figure 5:
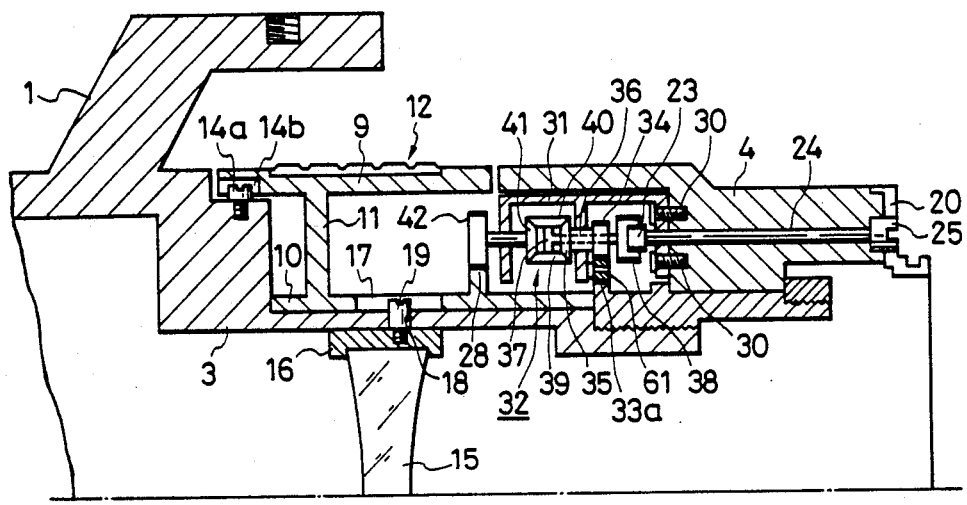
FIGS. 5 and 6 are sectional views, corresponding respectively to FIGS. 1 and 2, showing other embodiments of the invention in which the technical concept of the invention is applied to a lens barrel of the type shown in FIG. 4.
Figure 6:
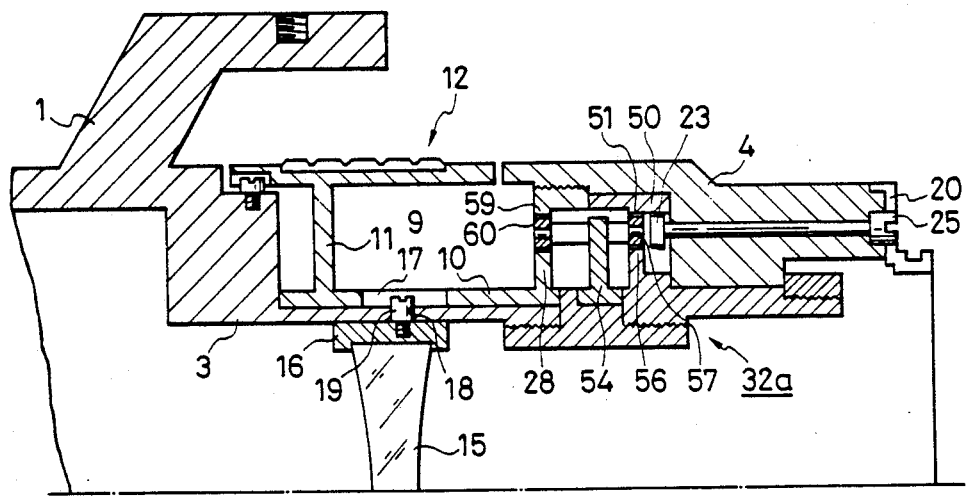

FIGS. 5 and 6 show other embodiments of the invention in which the technical concept of the invention is applied to a lens barrel of the type shown in FIG. 4. The embodiments shown in FIGS. 5 and 6 correspond to those shown in FIGS. 1 and 2, respectively. Therefore, in FIGS. 5 and 6, those components which have been described with reference to FIGS. 1 and 2 are therefore designated by the same reference numerals or characters.

In the embodiment shown in FIG. 5, the gear 42 in the first embodiment is engaged with the teeth 28 of the drive ring 12. In the embodiment shown in FIG. 6, the gear 60 in the first embodiment is engaged with the teeth 28. That is, in the embodiments of FIGS. 5 and 6, the teeth 28 serve as the drive gear. In the embodiments of FIGS. 5 and 6, the intermediate gear 22 and its relevant components are eliminated, and the construction is thereby simpler. In FIGS. 5 and 6, the locking member for locking the rotatable cylinder 4 to the stationary cylinder 3 is not expressly shown.

The embodiment of FIG. 5 is different from the embodiment of FIG. 1 in that the gear 34 is engaged through an intermediate gear with an external gear 33a which is integral with the stationary cylinder 3. The external gear 33a, corresponding to the internal gear 33 in the embodiment of FIG. 1, is used to determine the direction of rotation of the gear train. The internal gear 61 can be eliminated if the teeth 28 of the drive ring 12 is replaced by an internal gear which is engaged with the gear 42. In this case, the gear 34 can be engaged directly with the external gear 33a. In any case, the gear ratio of the gear 33 (33a) to the gear 34 is made equal to the gear ratio of the gear 28 to the gear 42.

As is apparent from the above description, according to the invention, the lens barrel of the type that the lens is driven by the motor provided on the camera body is made up of the stationary cylinder secured to the tripod mount and the rotatable cylinder having the camera mount which is coupled to the camera body. In the lens barrel thus constructed, when the drive shaft which is driven by the motor built in the camera body to drive the lens is revolved by rotating the rotatable cylinder, the rotation of the drive shaft is not transmitted to the lens. Therefore, the lens can be driven by the power of the motor built in the camera body. Furthermore, in the case where the stationary cylinder is supported through its tripod mount by a tripod, the camera body can be rotated together with the rotatable cylinder by a small operating force, and in this operation the lens is not moved at all. That is, the lens is maintained focused on the aimed object.

What is claimed is:

1. A device for driving a lens unit having a tripod mount, comprising:
    a stationary cylinder having said tripod mount;
    a rotatable cylinder with a mount part which is coupled to a camera body rotatably fitted in said stationary cylinder;
    a drive shaft rotatable by a drive source provided on a side of said camera body and rotatably supported in said rotatable cylinder;
    a drive gear which rotates around an optical axis of said lens unit which is supported by said stationary cylinder,;
    a lens which is moved in the direction of said optical axis as said drive gear rotates and which is supported by said stationary cylinder; and
    a planet gear mechanism interposed between said drive gear and a gear mounted on said drive shaft, said planet gear mechanism transmitting a first rotation of said drive shaft to said drive gear when said rotatable cylinder is stationary but not transmitting a second rotation of said drive shaft when said drive shaft is revolved by rotation of said rotatable cylinder.

2. A device as claimed in claim 1, wherein said planet gear mechanism includes a gear engaged with a geared surface fixed with respect to said stationary cylinder.

3. A device as claimed in claim 1, wherein said drive gear is an intermediate gear which is rotatably supported by a supporting ring which is fixed to said stationay cylinder and said internediate gear is operatively coupled to a gear of a drive ring which is manually operable to move said lens.

4. A device as claimed in claim 3, wherein said planet gear mechanism includes a first bevel gear rotatably coupled to said stationary cylinder, a second and a third bevel gears transverse to and engaged with said first bevel gear and rotatably carried on an arm member rotatably driven by said drive shaft and a fourth bevel gear engaged with said second and third bevel gears and rotatably coupled to said drive gear.

5. A device as claimed in claim 3, wherein said planet gear mechanism has a first and second planet gears rotatably supported respectively by first and second shafts rotably supported by a rotable support, said first planet gear being engaged with a rotatable internal gear engaged with said gear mounted on said drive shaft, said second planet gear being engaged with said drive gear and with an internal gear secured to said rotatable cylinder.

6. A device as claimed in claim 1, wherein said drive gear is a gear formed on a drive ring which is manually operable to move said lens.

7. A device as claimed in claim 6, wherein said planet gear machanism includes a first bevel gear rotatably coupled to said stationary cylinder, a second and a third bevel gears transverse to and engage with said first bevel gear and rotatably carried on an arm member rotatably driven by said drive shaft and a fourth bevel gear engaged with said second and third bevel gears and rotatably coupled to said drive gear.

8. A device as claimed in claim 6, wherein said planet gear mechanism has first and second planet gears rotatably supported respectively by first and second shafts rotably supported by a rotable support, said first planet gear being engaged with a rotatable internal gear engaged with said gear mounted on said drive shaft, said second planet gear being engaged with said drive gear and with an internal gear secured to said rotatable cylinder.

* * * * *